Patented Feb. 2, 1926.

1,571,892

UNITED STATES PATENT OFFICE.

ROY G. TELLIER, OF CHICAGO, ILLINOIS, ASSIGNOR TO THE PERMUTIT COMPANY, OF NEW YORK, N. Y., A CORPORATION OF DELAWARE.

WATER-SOFTENING ART AND MATERIAL.

No Drawing.    Application filed September 6, 1921.   Serial No. 498,876.

*To all whom it may concern:*

Be it known that I, ROY G. TELLIER, a citizen of the United States, residing in Chicago, county of Cook, and State of Illinois, have invented a new and useful Improvement in Water-Softening Art and Material, of which the following is a specification.

My invention relates to certain improvements in the art of softening hard water. More particularly, the invention is concerned with a new water-softening material and the preparation and use of such new water-softening material for acting upon the dissolved salts of calcium and magnesium to which the hardness of water is due.

Such new material is prepared from natural clay, that is, unctuous earthy matter consisting essentially of aluminum silicate, and having in admixture therewith a greater or less proportion of compounds of alkali metals or of alkali earth metals, or both.

To prepare such a material for use as a water-softening reagent, it must be brought into such a form as to present extensive surfaces to the water to be softened, and it is further essential for practical purposes that the material be in such form that it will not go into suspension, but will retain its cohesion. I have found that it is most desirable to so treat the natural clay as to reduce it to a coarse pulverulent or granular condition, the individual granules having sufficient hardness to resist crushing when formed into a bed and being so bound that they will not disintegrate and go into suspension or wash away. The clay, having been brought into this physical condition, can be formed into a filter-bed, permeable to water and presenting to the water drawn through the same extensive surfaces of active material.

A preferred method of treating the natural clay to bring it to such condition is to subject it to a low baking temperature by which it is dried and hardened. The dried and hardened mass may then be crushed to the desired degree of fineness, for instance, the fineness of small gravel or very coarse sand. When reduced to this size, the material is loosely packed in a suitable container to form a filter-bed for the water to be softened. Upon passing the hard water through a mass of such material, it is found that, by a chemical action in the nature of that taking place in softening of water by natural and artificial zeolites, the alkali metal (sodium or potassium) contained in the material of the filter-bed is exchanged for the alkali earth metal (calcium or magnesium) in the salts of the hard water, changing these salts to sodium or potassium salts. As in the case of the zeolites referred to, the action is found to be a reversible one, that is, when the active material in the filter-bed has spent itself, exchanging all of its sodium or potassium for the calcium or magnesium of the water, a solution of sodium or potassium chloride may be passed through the filter, and, the solution being of sufficient concentration according to the laws of mass action, the alkali metals will replace the alkali earth metals in the filter-bed. By this simple and well understood process, the latter may therefore be regenerated and rendered capable of softening a further quantity of hard water.

In most instances, it will be found of benefit to initially regenerate the clay, either before or after, or both before and after, baking same. Some few varieties of clay contain a sufficient proportion of alkali metal compounds to form efficient water-softening reagents without such regeneration, but in almost every instance, the exchange capacity of the material may be greatly enhanced by such initial regeneration.

In order that the invention may be better understood I will give a specific example of the method which I follow in treating a particular natural clay for rendering the same suitable for use as a water-softening reagent.

The clay which I have found best suited to this purpose occurs in Fall River County, S. D., and has the following typical analysis:

| | |
|---|---|
| $SiO_2$ | 52.51 |
| $TiO_2$ | .41 |
| $Al_2O_3$ | 25.72 |
| $Fe_2O_3$ | 6.40 |
| CaO | 2.40 |
| $Na_2O$ | 2.21 |
| $K_2O$ | .16 |
| MgO | Trace |
| Water and organic matter | 10.19 |
| | 100 |

The clay is mined preferably in relatively large masses, and in shipment to the place of treatment every effort is made to retain it in its natural moist condition and to prevent it from weathering or disintegrating.

On being received at the place of treatment, the material is cut, while still moist, into small lumps. As a measure of the size of the lumps, I have found it desirable to adopt the following standard: The greatest distance from the core of any lump to the nearest surface thereof not to exceed one-half inch. When so cut, the material is immersed in a twenty-five per cent solution of sodium chloride, maintained at a temperature of 95° to 100° C. It may here be noted that the best balance between economy of time and cost and chemical efficiency is obtained by making use of a solution in which the sodium chloride is about eight times the mass of the calcium or magnesium (calculated as oxides) in the batch of clay treated. To maintain this proper balance, it is necessary, after treatment of one batch of clay with the solution, to add sodium chloride to the latter in sufficient quantity to offset the loss by reaction, and preferably in somewhat greater quantity than this, to balance the calcium and magnesium chlorides formed by the reaction and now present in the solution. By the continuous addition of sodium chloride, for instance, one and one-half times in mass the mass of the calcium and magnesium oxides in each batch of clay treated, the same solution may be used for the treatment of about four charges, at the end of which time the concentration of the calcium and magnesium chlorides has risen so far as to make it uneconomical to further employ the same solution. The time of immersion of the clay in the hot sodium chloride solution will vary in accordance with the size of the lumps treated. I find that for the smallest lumps the time should not be less than forty minutes, and for the largest lumps, as gauged by the standard set above, two hours and twenty minutes is required. Immersion for a greater length of time has a tendency to soften the clay unduly, and since this length of time is required to permit the solution to penetrate to the core of the lumps, it will be seen that it is of importance that they should not exceed the limit given for size.

After removal from the sodium chloride bath, the lumps of clay are spread thinly in trays and allowed to slowly harden at normal indoor atmosphere temperatures, being carefully protected from sun and weather. The time required for the hardening process varies with the exact temperature and with the humidity of the atmosphere, being usually between five and fifteen days. At the end of this time, the clay has become sufficiently hard so that it does not readily break between the fingers, and when broken shows a clean fracture with no sign of sealing.

The material is now ready for final finishing, drying and hardening. The drier used should preferably be of the direct heat type, permitting the carbon-dioxide resulting from combustion of the fuel to come into direct contact with the material, which is advantageous as making for greater hardness of the same. The temperature in the drier should be regulated to remain below 110° C., even lower temperatures than this being advantageous, but requiring a somewhat longer period of treatment. If the material is in proper condition when placed in the drier, the drying operation may be completed, using the maximum temperature given, in twenty-four hours, and at the end of this time the lumps, on being broken open, are of a uniform grayish-white color all the way through and feel dry and smooth to the hand.

After the drying operation, the material should be granulated as soon as possible, and if stored must be kept in a dry place, since it readily absorbs moisture from the atmosphere. The size of the granules is not dictated by any chemical considerations, but purely by the mechanical requirements of the art of softening water. I find that granules which will pass through a six mesh screen are well suited for forming into a filter-bed for ordinary sized installations. If practical conditions permit, a smaller mesh should be used, since the exchange capacity or speed of the reagent seems to be almost directly in proportion to the extent of the surface of the same.

To increase the hardness and thereby lengthen the life of the material under conditions of use, it is now placed in a medium high temperature furnace for a heating treatment, preferably in a slightly oxidizing atmosphere. The time required in the furnace varies directly with the size of the grain and the volume or dimensions of the mass of material as it rests in the furnace. The temperature of the furnace should not exceed 775° C. for the best results, and may be materially lower than this. The temperature of the entire mass of material, however, should not be substantially below 700° C. In an average small furnace, the thickness of the layers of material being from one to two inches and the furnace temperature about 750° C. before entering the charge, a period of treatment of from forty minutes to one and one-half hours will be found sufficient. In the present modification of the invention, I prefer the longer period mentioned.

This heat treatment bakes the material, driving out all uncombined water and most (if not all) of the combined water as well, reducing the granules to a baked or partially sintered form.

From the furnace the material is poured directly, while still hot, into a quenching and hydrating bath composed of a twenty-five per cent sodium hydroxide solution. If the temperature of heat treatment of material is substantially below 700° C., it is preferable, however, to use a bath of sodium chloride. To complete the rehydration process, the material is either left in the same solution or put into another like solution, and the whole brought to just under the boiling point for a period of from twenty minutes to one hour and twenty minutes, depending upon the size of the grain. When the grains, on being broken open, show that they have changed all the way thru from a light reddish or yellowish brown (their color as they come from the furnace) to a smooth, glossy, dark-brown color, the material has been sufficiently hydrated and without injuring its mechanical hardness. In this connection it should be borne in mind that while the hydrating of the material increases its chemical efficiency, that is, its capacity for exchanging its base for the base of the hard water salts, the mechanical hardness, and consequently the life of the material is sacrificed in the same measure. It is therefore necessary to strike a proper balance between length of life and chemical efficiency, and to adjust the hydration accordingly.

The same considerations govern the temperatures to be used in the heat treatment. The use of high temperatures approaching 775° C. effects more complete dehydration, reducing the chemical efficiency of the product, but at the same time increasing the mechanical hardness and life. Lower temperatures, particularly temperatures in the neighborhood of or below 700° C. do not effect such complete dehydration, and therefore give a product of greater chemical efficiency but of inferior hardness and shorter life. I prefer to use the process above described, in which the higher temperatures of heat treatment are employed, and the material is subsequently treated with a caustic base to restore its permutative capacity and perhaps rehydrate it to a certain extent.

The present application contains matter in common with my prior and copending application No. 100,312, filed May 27, 1916, and is directed more particularly to the method of treatment which involves substantial dehydration of the product by heat treatment which yields a hard, pervious product which is quite highly resistant to the disintegrating action of water, and treatment of the material with a suitable substance, preferably an agent capable of restoring the exchange capacity of the material, such as a solution of a base comprising an alkali metal, or an equivalent compound, which possesses the power of imparting or restoring to the material a high exchange capacity for water-softening purposes. The use of a solution of a caustic base, such as caustic soda, serves both to effect chemical exchange of the alkali metal of such base and the alkali earth metal of the mineral and perhaps to partially rehydrate the mineral. Any caustic base may be used, however, or any suitable equivalent. On the other hand, these materials will accomplish regeneration, as will also other compounds capable of furnishing the alkali metal. It may be added that while such a compound as sodium chloride will serve in the ordinary use of a softener comprising the mineral as a regenerating agent, material which has been baked for a period of 1½ hours at a temperature above 700° C. is best restored to high exchange capacity by treatment with a caustic base, and in the ordinary use of the material thereafter the regeneration may be quickly and satisfactorily accomplished by such a material as a common salt solution. The exact nature of the change which occurs by treating the highly resistant (to disintegration) material with NaOH, for example, is not definitely known. It seems probable, however, that a film of a silicate or silicates is formed on the mineral, and doubtless rehydration is effected to some extent, or, at any rate, the mineral is put into better condition to permit the hard water to reach the base-exchanging compounds in the mineral.

While I have described in considerable detail a specific manner of carrying out my new process of producing a water-softening reagent from a particular natural clay, it is to be understood that this description is illustrative only and for the purpose of making clear the principles underlying the invention. I do not regard the invention as limited to these detail steps of procedure, or any of them, except in so far as such limitations are included in the terms of the following claims, in which it is my intention to claim all novelty inherent in my invention as broadly as is permissible in view of the prior art.

What I regard as new, and desire to secure by Letters Patent, is—

1. The method of preparing a water-softener which comprises hardening and substantially dehydrating clay containing a compound of a metal of the alkali metal or alkali earth metal groups by heat treatment so applied as to render the product permeable and highly resistant to the disintegrating action of water, and treating such product with a solution containing alkali.

2. The method of producing a water-softener which comprises rendering a natural zeolitic material which contains hydrated double silicates, resistant to the disintegrating action of water by heat treatment at a temperature high enough to effect substantial dehydration and rehydrating and restoring exchange capacity by treating the heated material with a solution of caustic soda.

3. The method of producing a water-softener which comprises treating clay containing a metal of the alkali metal or alkali earth metal groups with heat and incorporating a base comprising an alkali base, the heat treatment being such as to yield a hard pervious product highly resistant to the disintegrating action of water and the base being such that the treated product will possess a high exchange capacity.

4. The method of producing a water-softener which comprises heat hardening small pieces of clay containing a compound of an alkali earth or of an alkali metal, thereby obtaining a substantially dehydrated, pervious product which is highly resistant to the disintegrating action of water, and treating such product with a solution of caustic alkali.

5. The method of producing a water-softener which comprises drying pieces of clay at moderate temperature, subsequent breaking of the clay into smaller pieces, subsequent heating of the material to produce a hard mineral which resists disintegration and is pervious, and subsequent treating of the heated product with a solution of a caustic base capable of restoring the heated product to a condition in which it possesses a high exchange capacity for water-softening purposes.

6. In the preparation of a water-softening material adapted for use in granular bed-softeners, the process which comprises drying a soft hydrated silicate material containing double silicates of aluminum and a more electropositive metal, reducing such material to pieces of the desired size, heating the material at such temperature and for such a period that it will yield a hard, pervious product which is resistant to the disintegrating action of water and of low exchange capacity, and treating such resistant product with an aqueous solution of an alkali.

7. In the process of preparing material for softening water adapted for use in a granular bed-softener, the steps which comprise freeing a soft hydrated silicate material of clayey consistency and containing components of zeolitic nature having exchange properties, of much of the contained water, reducing the material to a desired size, subjecting the material to heat treatment at such temperature and for such a period as to yield a pervious product which is highly resistant to the disintegrating action of water and of low exchange capacity, and treating the product thus prepared with a solution of a base comprising an alkali metal to give the product a high exchange capacity.

8. The method of preparing a material for softening water, which consists in baking a silicate containing aluminum and a metal of the alkali metal or the alkali metal groups at a temperature of approximately 700° C. for a sufficient period of time to render the material pervious, hard and highly resistant to the disintegrating action of water, whereby the material is substantially dehydrated thereby incidentally greatly reducing its exchange capacity, and subjecting such product to the action of a base comprising an alkali metal to restore its exchange capacity.

9. The method of preparing a material for softening water which consists in baking a silicate containing aluminum and a metal of the alkali metal or the alkali metal groups at a temperature of approximately 700° C. for a sufficient period of time to render the material pervious, hard and highly resistant to the disintegrating action of water, whereby the material is substantially dehydrated, and subjecting such product to the action of a caustic base, whereby the product is put into a condition in which it possesses a high exchange capacity for water-softening purposes.

10. The method of preparing a water-softener which comprises hardening and substantially dehydrating clay by heat treatment so applied as to render the product permeable, the material being exposed during the heat treatment to the action of burning gases.

11. The method of preparing a water-softener which comprises hardening and substantially dehydrating clay by heat treatment so applied as to render the product permeable, the material being subjected, during heat treatment, to a slightly oxidizing atmosphere.

12. The method of producing a water-softener which comprises subjecting a clay containing a silicate of aluminum and a metal of the alkali metal or the alkali earth metal groups to heat treatment in an atmosphere containing carbon-dioxid at a temperature of approximately 700° C. and subjecting the baked material to the action of an alkali.

13. The process of forming a water-softening material which consists in subjecting to a solution of the salt of an alkali metal a clay containing a substantial proportion of alkali earth, drying and hardening the material so treated by exposure to an atmosphere containing carbon dioxide and at a temperature not substantially exceeding 110° C., baking the dried and hardened material at a temperature of approximately 700° C. in the presence of an atmosphere containing carbon dioxid, and subjecting the baked material to the action of a solution of an alkali.

14. The process of forming and preparing a water-softening material which comprises drying a clay containing a substantial proportion of alkali earth at moderate temperature, breaking the material into a desired granule size, baking the product in the presence of a gas relatively rich in carbon dioxid at a temperature of approximately 700° C., and subjecting the baked material to an aqueous solution of an alkali.

15. The process of producing a water-softener which comprises baking clay which comprises a compound silicate of aluminum and of a metal of the alkali metal or alkali earth metal groups at a temperature of approximately 700° C. in the presence of a gas relatively rich in carbon dioxid, thereby obtaining a substantially dehydrated, pervious product, and treating such product with a solution of alkali.

16. In the manufacture of a material suitable for use in granular bed-softeners from soft natural aluminous dehydrated material, the process which comprises the baking of such a mineral material to harden it sufficiently for the described purpose, and to drive off water of hydration, and a treatment with sodium hydroxid to cause said material to take up replaceable sodium and possess a high exchange capacity.

17. As an article of manufacture, a material for water-softening purposes comprising a baked clay containing silicate of aluminum and a compound of a metal of the alkali metal or alkali earth metal groups, such baked clay being permeable and highly resistant to the disintegrating action of water and having been subjected after the baking operation to the action of a caustic base.

18. As an article of manufacture, a material for water-softening purposes comprising a baked clay containing silicate of aluminum and a compound of a metal of the alkali metal or alkali earth metal groups, such baked clay being permeable and highly resistant to the disintegrating action of water and having been subjected after the baking operation to treatment with a caustic alkali.

19. As an article of manufacture, a material for water-softening purposes comprising a baked clay containing silicate of aluminum and a compound of a metal of the alkali metal or alkali earth metal groups, such baked clay being permeable and highly resistant to the disintegrating action of water and having been subjected after the baking operation to the action of a strong solution of caustic soda.

20. The method of softening water which comprises passing hard water through a granular bed comprising baked pervious clay containing aluminum silicate, and a compound of an alkali metal, such baked clay being highly resistant to the disintegrating action of water and having been treated, after the baking operation, with a compound of an alkali earth having the action of a caustic base, and then possessing high exchange capacity for water-softening purposes.

21. The process of producing a water-softener which comprises heating a mineral containing a hydrated silicate of aluminum at a temperature approximating 700° C. for a period of at least approximately one hour to substantially completely dehydrate the material, and then subjecting the mineral to rehydrating treatment with a solution of a caustic base.

22. In the preparation of a water-softening material adapted for use in granular bed-softeners, the process which comprises drying a soft hydrated silicate material containing double silicate of aluminum and of a more electropositive metal, heating the material at such temperature and for such a period that it will yield a hard, pervious product which is highly resistant to the disintegrating action of water, and treating such resistant product with a solution of an alkali metal base capable of restoring the resistant product to a condition in which it possesses a suitable exchange capacity for water-softening purposes.

23. The method of preparing a water-softening compound which comprises subjecting clay having base-exchanging properties to a temperature not substantially less than 700° C. and not high enough to render the clay impervious, thereby incidentally reducing the exchange capacity of the clay, and subsequently treating the highly resistant product thus obtained with a solution of a compound of an alkali metal having the action of a caustic base, to substantially restore the exchange capacity of the mineral.

24. A process for forming a water softening material which consists in heating a mineral containing hydrated silicate of aluminum to a temperature sufficient to substantially complete dehydration and then rehydrating the material.

ROY G. TELLIER.